US012043801B2

(12) United States Patent
Badiola et al.

(10) Patent No.: US 12,043,801 B2
(45) Date of Patent: Jul. 23, 2024

(54) APPARATUS AND PROCESSES FOR PYROLYSIS OF PLASTIC FEEDS

(71) Applicant: Encina Development Group, LLC, The Woodlands, TX (US)

(72) Inventors: Carlo Badiola, Houston, TX (US); Song Wang, Basking Ridge, CA (US); S. B. Reddy Karri, Naperville, IL (US); John Findlay, Homer Glen, IL (US)

(73) Assignee: E2 Technologies, LLC, The Woodlands, TX (US)

( * ) Notice: Subject to any disclaimer, the term of this patent is extended or adjusted under 35 U.S.C. 154(b) by 0 days.

(21) Appl. No.: 17/698,174

(22) Filed: Mar. 18, 2022

(65) Prior Publication Data

US 2023/0002681 A1 Jan. 5, 2023

Related U.S. Application Data

(60) Provisional application No. 63/217,051, filed on Jun. 30, 2021.

(51) Int. Cl.
*C10G 1/10* (2006.01)
*B01J 6/00* (2006.01)
(Continued)

(52) U.S. Cl.
CPC ............... *C10G 1/10* (2013.01); *B01J 6/008* (2013.01); *B01J 21/08* (2013.01); *B01J 23/02* (2013.01);
(Continued)

(58) Field of Classification Search
None
See application file for complete search history.

(56) References Cited

U.S. PATENT DOCUMENTS 6,774,272 B2 8/2004 Miller
6,822,126 B2 11/2004 Miller
(Continued)

FOREIGN PATENT DOCUMENTS

WO WO-0105908 A1 * 1/2001 ............. C10G 1/002
WO WO-2020212403 A1 * 10/2020 ............... B01D 3/14

OTHER PUBLICATIONS

International Search Report and Written Opinion dated Nov. 28, 2022 for International Application No. PCT/US2022/073246.

*Primary Examiner* — In Suk C Bullock
*Assistant Examiner* — Alyssa L Cepluch
(74) *Attorney, Agent, or Firm* — Patterson + Sheridan, LLP

(57) ABSTRACT

The present disclosure relates to apparatus and processes for pyrolysis of feeds, such as plastic feeds. In at least one embodiment, a process includes introducing a plastic melt including a plastic component into a reactor via a nozzle coupled with the reactor. The process includes introducing a catalyst into the reactor via a first conduit coupling the reactor with a riser or a regenerator. The process includes pyrolyzing the plastic component to form a pyrolysis product. The process includes removing the pyrolysis product from the reactor via a second conduit disposed at a top ½ height of the reactor. The process includes removing the catalyst from the reactor via a third conduit disposed at a bottom ½ height of the reactor, wherein the catalyst removed from the reactor comprises ash.

26 Claims, 3 Drawing Sheets

(51) Int. Cl.
  *B01J 21/08* (2006.01)
  *B01J 23/02* (2006.01)
  *B01J 29/06* (2006.01)
(52) U.S. Cl.
  CPC ...... *B01J 29/06* (2013.01); *C10G 2300/1003* (2013.01)

(56) References Cited

U.S. PATENT DOCUMENTS

| | | |
|---|---|---|
| 6,827,843 B2 | 12/2004 | Elomari |
| 6,881,323 B2 | 4/2005 | Zones |
| 7,083,714 B2 | 8/2006 | Elomari |
| 7,459,073 B2 | 12/2008 | Burton, Jr. et al. |
| 7,550,073 B2 | 6/2009 | Zones et al. |
| 7,622,032 B2 | 11/2009 | Zones et al. |
| 8,450,543 B2 | 5/2013 | Peters et al. |
| 8,835,706 B2 | 9/2014 | Iyer et al. |
| 8,916,043 B2 | 12/2014 | Charon et al. |
| 9,200,207 B2 | 12/2015 | Huang et al. |
| 9,428,695 B2 | 8/2016 | Narayanaswamy et al. |
| 9,539,545 B2 | 1/2017 | Elomari |
| 9,790,179 B2 | 10/2017 | Tanzio et al. |
| 10,233,395 B2 | 3/2019 | Ward et al. |
| 10,442,997 B2 | 10/2019 | Narayanaswamy et al. |
| 10,513,661 B2 | 12/2019 | Narayanaswamy et al. |
| 10,563,130 B2 | 2/2020 | Narayanaswamy et al. |
| 10,851,309 B2 | 12/2020 | Ramamurthy et al. |
| 10,858,593 B2 | 12/2020 | Ramamurthy et al. |
| 10,899,991 B2 | 1/2021 | Atkins et al. |
| 10,927,315 B2 | 2/2021 | Ramamurthy et al. |
| 10,954,452 B2 | 3/2021 | Tanzio et al. |
| 10,975,313 B2 | 4/2021 | Ramamurthy et al. |
| 11,084,988 B2 | 8/2021 | Sorensen, Jr. et al. |
| 11,091,700 B2 | 8/2021 | Atkins et al. |
| 2001/0000323 A1 | 4/2001 | Lee et al. |
| 2001/0027935 A1 | 10/2001 | Lee et al. |
| 2002/0104780 A1 | 8/2002 | Elomari |
| 2002/0136687 A1 | 9/2002 | Miller |
| 2003/0019789 A1 | 1/2003 | Kwak |
| 2003/0066784 A1 | 4/2003 | Elomari |
| 2003/0066785 A1 | 4/2003 | Elomari |
| 2003/0127359 A1 | 7/2003 | Takewaki et al. |
| 2004/0020827 A1 | 2/2004 | Elomari |
| 2004/0020828 A1 | 2/2004 | Elomari |
| 2004/0106511 A1 | 6/2004 | Elomari |
| 2004/0188324 A1 | 9/2004 | Elomari |
| 2004/0191144 A1 | 9/2004 | Takewaki et al. |
| 2004/0200757 A9 | 10/2004 | Takewaki et al. |
| 2005/0087478 A1 | 4/2005 | Zones et al. |
| 2006/0020047 A1 | 1/2006 | Wilkerson |
| 2006/0138026 A1 | 6/2006 | Chen et al. |
| 2007/0034549 A1 | 2/2007 | Elomari |
| 2007/0284284 A1 | 12/2007 | Zones et al. |
| 2007/0292343 A1 | 12/2007 | Chen |
| 2008/0257794 A1 | 10/2008 | Valerio |
| 2009/0007484 A1 | 1/2009 | Smith |
| 2010/0087686 A1 | 4/2010 | Fong et al. |
| 2010/0121122 A1 | 5/2010 | Zones et al. |
| 2010/0121124 A1 | 5/2010 | Zones et al. |
| 2010/0234637 A1 | 9/2010 | Fong et al. |
| 2012/0203042 A1* | 8/2012 | Huber ............... C10G 11/18 585/242 |
| 2013/0131414 A1 | 5/2013 | Iyer et al. |
| 2013/0217934 A1 | 8/2013 | Chewter et al. |
| 2013/0261323 A1 | 10/2013 | Peters et al. |
| 2013/0338415 A1 | 12/2013 | Iyer et al. |
| 2014/0083835 A1 | 3/2014 | Frediani et al. |
| 2015/0080624 A1 | 3/2015 | Gephart et al. |
| 2015/0166895 A1* | 6/2015 | Lehto ............... C10B 57/06 202/105 |
| 2015/0377079 A1 | 12/2015 | Noureldin |
| 2016/0002544 A1 | 1/2016 | Sorensen, Jr. et al. |
| 2016/0122190 A1 | 5/2016 | Schmelzer et al. |
| 2016/0137924 A1 | 5/2016 | Mazanec et al. |
| 2016/0145496 A1 | 5/2016 | Sorensen |
| 2016/0326438 A1 | 11/2016 | Sorensen et al. |
| 2016/0362609 A1 | 12/2016 | Ward et al. |
| 2017/0198221 A1 | 7/2017 | Targett et al. |
| 2017/0247617 A1 | 8/2017 | Schenk et al. |
| 2017/0369786 A1 | 12/2017 | Dalton |
| 2018/0079968 A1 | 3/2018 | Chen et al. |
| 2018/0094197 A1 | 4/2018 | Tanzio et al. |
| 2018/0187087 A1 | 7/2018 | Atkins et al. |
| 2018/0216009 A1 | 8/2018 | Narayanaswamy et al. |
| 2018/0273848 A1 | 9/2018 | Atkins et al. |
| 2019/0161683 A1 | 5/2019 | Narayanaswamy et al. |
| 2019/0177626 A1 | 6/2019 | Ramamurthy et al. |
| 2019/0233751 A1 | 8/2019 | Medoff |
| 2019/0308183 A1 | 10/2019 | Agblevor et al. |
| 2019/0367428 A1 | 12/2019 | Ramamurthy et al. |
| 2020/0017772 A1 | 1/2020 | Ramamurthy et al. |
| 2020/0017773 A1 | 1/2020 | Ramamurthy et al. |
| 2020/0071619 A1 | 3/2020 | Humphreys et al. |
| 2020/0247910 A1 | 8/2020 | Sheppard et al. |
| 2020/0248082 A1 | 8/2020 | Trapp et al. |
| 2020/0248085 A1 | 8/2020 | Trapp et al. |
| 2020/0248086 A1 | 8/2020 | Trapp et al. |
| 2020/0308085 A1 | 10/2020 | Washburn et al. |
| 2020/0362248 A1 | 11/2020 | Cartolano et al. |
| 2020/0369965 A1 | 11/2020 | Bitting et al. |
| 2020/0369966 A1 | 11/2020 | Bitting et al. |
| 2021/0009911 A1 | 1/2021 | Medoff |
| 2021/0130262 A1 | 5/2021 | Wu et al. |
| 2021/0130699 A1 | 5/2021 | Bitting et al. |
| 2021/0130700 A1 | 5/2021 | Wu et al. |
| 2021/0139620 A1 | 5/2021 | Slivensky et al. |
| 2021/0222073 A1 | 7/2021 | Al-Shammari et al. |
| 2021/0269725 A1 | 9/2021 | Pechimuthu et al. |
| 2021/0269726 A1 | 9/2021 | Al-Majnouni et al. |
| 2021/0284122 A1 | 9/2021 | Marri et al. |
| 2021/0309591 A1 | 10/2021 | Ali et al. |
| 2022/0195310 A1* | 6/2022 | Schenk ............... C10B 49/10 |
| 2023/0134082 A1* | 5/2023 | DeBruin ............... C10G 70/00 252/373 |

* cited by examiner

APPARATUS AND PROCESSES FOR PYROLYSIS OF PLASTIC FEEDS

FIELD

The present disclosure relates to apparatus and processes for pyrolysis of feeds, such as plastic feeds.

BACKGROUND

Waste plastics are mostly diverted to landfills or are incinerated, with a smaller fraction being diverted to recycling. However, over the years, with increased regulations and levies on landfills, the percentage of the post-consumer waste being recycled or incinerated for energy recovery is gradually increasing.

Attempts have been made to crack the plastic into useful products using conventional cracking apparatus that are used for cracking of petroleum derived feeds such as gas oils. For example, plastic feeds in powder form or pellets have been introduced into fluidized catalytic cracking reactors, which, for plastic feeds, require high temperatures.

In addition, the presence of chlorine in waste plastic (e.g., of polyvinylchloride) promotes corrosion of reactor internals, requiring a separate dechlorination process before the dechlorinated product can be introduced to a reactor and other components of an apparatus. Such additional dechlorination steps (and reactors for dechlorination) reduce throughput and yield of desired cracked products.

Further reducing throughput and yield are spent catalyst (formed in the pyrolysis reactor during pyrolysis). Spent catalyst can be regenerated in a conventional regenerator, but the amount of regeneration is insufficient particularly while using plastic feeds containing chlorine and trace metals.

There is a need for apparatus and processes that provide high throughput of feeds, such as plastic feeds, that can be converted by pyrolysis and catalytic upgrade to form hydrocarbon products with high yields.

SUMMARY

The present disclosure relates to apparatus and processes for pyrolysis of feeds, such as plastic feeds.

In at least one embodiment, a process includes introducing a plastic melt including a plastic component into a reactor via a nozzle coupled with the reactor. The process includes introducing a catalyst into the reactor via a first conduit coupling the reactor with a riser, standpipe, or a regenerator. The process includes pyrolyzing the plastic component to form a pyrolysis product. The process includes removing the pyrolysis product from the reactor via a second conduit disposed at a top ½ height of the reactor. The process includes removing the catalyst from the reactor via a third conduit disposed at a bottom ½ height of the reactor, wherein the catalyst removed from the reactor comprises ash. The process includes introducing the catalyst from the third conduit to a separator to form a catalyst-rich phase and an ash-rich phase in the separator.

In at least one embodiments, a process includes removing a catalyst from a reactor, wherein the catalyst comprises ash. The process includes introducing the catalyst via a conduit to a separator to form a catalyst-rich phase and an ash-rich phase in the separator. The process includes introducing the catalyst-rich phase to a regenerator to form a regenerated catalyst. The conduit has an end disposed within the separator at a ¼ to ¾ height of the separator and the end comprises a plurality of outlets.

These and other features and attributes of embodiments of the present disclosure and their advantageous applications and/or uses will be apparent from the detailed description which follows.

BRIEF DESCRIPTION OF THE FIGURES

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
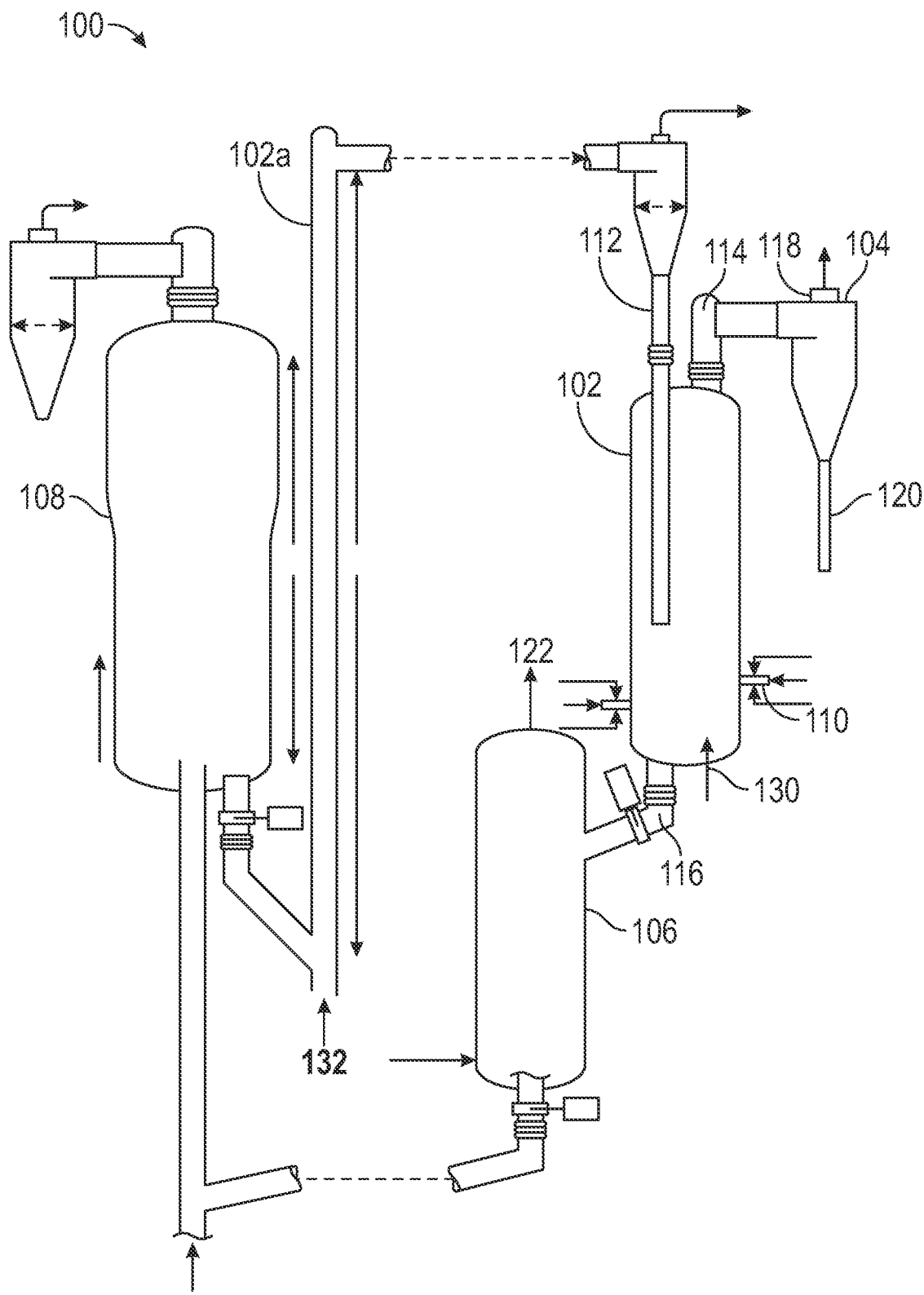
FIG. 1 is an apparatus and process flow for pyrolysis of plastic feeds, according to an embodiment.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

The present disclosure relates to apparatus and processes for pyrolysis of feeds, such as plastic feeds.

In some embodiments, provided is a process including introducing a plastic melt including a plastic component into a reactor via one or more nozzles coupled with the reactor. The process includes introducing a catalyst into the reactor using dilute-phase pneumatic transfer of regenerated catalyst coupled with the reactor via cyclone, standpipe, or vessel-dipleg system. The process includes pyrolyzing the plastic component to form a pyrolysis product. The process includes removing the pyrolysis product from the reactor via a second conduit disposed at a top ½ height of the reactor. The process includes removing the catalyst from the reactor via a third conduit disposed at a bottom ½ height of the reactor, wherein the catalyst removed from the reactor comprises ash. The process includes introducing the catalyst from the third conduit to a separator to form a catalyst-rich phase and an ash-rich phase in the separator.

In some embodiments, provided is an apparatus including one or more nozzles coupled with a reactor. The nozzle includes an inlet disposed substantially perpendicular to a horizontal conduit disposed in the nozzle. The apparatus includes a riser coupled with the reactor. The apparatus includes a first outlet conduit disposed at a top ½ height of the reactor. The first outlet conduit is coupled with a cyclone separator. The apparatus includes a second outlet conduit disposed at a bottom ½ height of the reactor. The second outlet conduit is coupled with a second separator. The apparatus includes a regenerator coupled with the second separator and the riser.

Apparatus and processes of the present disclosure provide high throughput of pyrolysis products formed using pyrolysis of plastic. Processes can be performed as a single-stage process, providing higher yields than conventional processes for processing waste plastic. Apparatus and processes of the present disclosure provide elutriation of char, char ash, attrited catalyst, and co-injection material such that spent catalyst can be easily regenerated, providing improved throughput of the pyrolysis products in addition to higher purity of recycled catalyst to the reactor. In addition, use of catalyst having a narrow size distribution and larger average diameter than the co-injection material provides elutriation of co-injection material from the catalyst in the reactor. In addition, use of catalyst having a large average diameter, in addition to a reactor configured to provide bubble control, provides reduced plugging and wear of vessel conduits, valves, and other apparatus components, providing maintained integrity and a longer life cycle of apparatus of the present disclosure.

In addition, use of a separator of the present disclosure provides improved throughput of pyrolysis products because of improved separation of spent catalyst from components such as ash. Throughput is improved using the separator because, inter alia, the time intervals between apparatus shutdown can be lengthened because catalyst can remain viable (e.g., the catalyst is regenerated). A separator of the present disclosure can also provide improved regeneration of spent catalyst (because ash is removed in the separator), which further improves throughput and yield of pyrolysis products.

Reactor Conditions

In some embodiments, provided is a process including introducing a plastic melt including a plastic component into a reactor via one or more nozzles coupled with the reactor. The process includes introducing a catalyst into the reactor by pneumatic transfer via a first conduit coupling the reactor with a riser. For example, the process may include introducing a catalyst into the reactor using dilute-phase pneumatic transfer of regenerated catalyst coupled with the reactor via cyclone-dipleg system. The process includes pyrolyzing the plastic component to form a pyrolysis product. The process includes removing the pyrolysis product from the reactor via a second conduit disposed at a top ½ height of the reactor and removing the catalyst from the reactor via a third conduit disposed at a bottom ½ height of the reactor.

Apparatus and Process Flow

FIG. 1 is an apparatus 100 and process flow for pyrolysis of plastic feeds, according to an embodiment. Apparatus 100 includes a pyrolysis reactor 102, a riser 102a, a first separator 104, a second separator 106, and a regenerator 108.

A plastic melt is introduced into pyrolysis reactor 102 via nozzle 110. The plastic melt can include any suitable plastic material, such as plastic scrap, automotive plastic waste, thermoplastics, thermosets, or combination(s) thereof. The plastic melt can include one or more plastics such as polyethylene, polypropylene, polystyrene, polyethylene terephthalate, polyvinylchloride, or combination(s) thereof. The plastics can be obtained from recyclable plastics. For example, a bale comprising the plastics can be sorted into a plurality of portions, where at least one of the portions comprises one or more of the plastics. In some embodiments, the plastic melt is introduced into the reactor at a rate of about 60,000 lb/hr to about 100,000 lb/hr, such as about 75,000 lb/hr to about 85,000 lb/hr. The plastic melt can be provided to the nozzle 110 by a plastic melt source (not shown) that can be configured to provide heat to the plastic to form the plastic melt. In some embodiments, the plastic melt, upon being introduced to the reactor, has a solids (e.g., char) content of about 20 wt % or less upon introduction into reactor 102, such as about 15 wt % or less, such as about 10 wt % or less, such as about 5 wt % or less, such as about 1 wt % or less.

The plastic melt may further include a viscosity reducing agent. For example, a viscosity reducing agent can be a recycled portion of pyrolysis product, such as an organic compound (e.g., aromatic or mono-olefin), such as an ethylene, a propylene, a butene, a benzene, a toluene, a xylene, or combination(s) thereof. The viscosity reducing agent may, additionally or alternatively, include a paraffinic organic compound such as a $C_4$-$C_{100}$ paraffin, such as a $C_6$-$C_{50}$ paraffin, such as a $C_{10}$-$C_{30}$ paraffin. The viscosity reducing agent can be introduced to the plastic melt in the plastic melt source (not shown) or nozzle 110. In some embodiments, a weight ratio of plastic to viscosity reducing agent (upon introduction to the reactor) is about 0.5:1 to about 1.5:1, such as about 1:1. In some embodiments where the plastic melt includes a viscosity reducing agent, the plastic melt is introduced into the reactor at a rate of about 60,000 lb/hr to about 200,000 lb/hr, such as about 120,000 lb/hr to about 200,000 lb/hr, such as about 148,000 lb/hr to about 172,000 lb/hr.

A catalyst can be introduced into the pyrolysis reactor 102 via a first conduit 112. Conduit 112 couples reactor 102 to riser 102a. Conduit 112 can be disposed at a top ½ height of the reactor (as shown in FIG. 1) or alternatively can be a dipleg return coupled with riser 102a at a first end and the reactor 102 at a second end such that the second end of the dipleg return (conduit 112) is disposed at the bottom ½ height of the reactor.

The plastic melt and the catalyst in reactor 102 pyrolyze the plastic(s) to form a pyrolysis product. In some embodiments, the catalyst is introduced into reactor 102 via the first conduit 112 at a catalyst flow rate of about 5.5 tons per minute to about 13.8 tons per minute, such as about 7.5 tons per minute to about 12.4 tons per minute. In some embodiments, the catalyst disposed in the riser 102a has a minimum gas fluidization velocity of about 0.4 ft/sec to about 0.6 ft/sec. In some embodiments, a weight ratio of catalyst to feed (e.g., plastic melt with or without viscosity reducing agent) in reactor 102 is about 15:1 to about 5:1, such as about 11:1 to about 7:1, such as about 9:1.

The pyrolysis product is removed from reactor 102 via a second conduit 114 disposed at a top ½ height of the reactor. The catalyst is removed from reactor 102 via a third conduit 116 disposed at a bottom ½ height of the reactor. For example, the catalyst can be removed from the reactor via third conduit 116, where third conduit 116 is disposed at a bottom surface of the reactor 102.

In some embodiments, reactor 102 is a bubbling bed reactor. Alternatively, a fluidized bed reactor, slurry reactor, rotating kiln reactor, or packed bed reactor may be used. The plastic melt (e.g., without viscosity reducing agent) can have a temperature of about 900° F. to about 1,100° F., such as about 1,000° F. to about 1,050° F., alternatively about 900° F. to about 1,020° F., during introducing the plastic melt into the reactor. Alternatively, the plastic melt (e.g., with viscosity reducing agent) can have a temperature of about 300° F. to about 700° F., such as about 350° F. to about 665° F., during introducing the plastic melt into the reactor.

In some embodiments, a reactor temperature during pyrolysis of the plastic melt is about 900° F. to about 1,100° F., such as about 1,000° F. to about 1,050° F., alternatively about 900° F. to about 1,020° F. For example, pyrolyzing the plastic may be performed at a reactor temperature of about 900° F. to about 1,100° F., such as about 1,000° F. to about 1,050° F., and/or a reactor pressure of about 20 psig to about 40 psig, such as about 27 psig to about 33 psig.

Pyrolysis of the present disclosure can provide the pyrolysis product such that the pyrolysis product includes valuable monomers of light gas olefins and aromatics, such as benzene, toluene, xylenes, or combination(s) thereof. The process yields are tunable to the desired yields of olefins and aromatics by using a combination of the catalyst, reactor setup, and process operating conditions. The pyrolysis product can include an organic compound, such as a $C_2$-$C_{12}$ hydrocarbon. In some embodiments, the pyrolysis product includes an organic compound selected from the group consisting of ethylene, propylene, and combination(s) thereof. In some embodiments, the pyrolysis product includes an organic compound selected from the group consisting of an ethylene, a propylene, a butene, a benzene, a toluene, a xylene, and combination(s) thereof.

In some embodiments, in addition to the catalyst, a co-injection particle is introduced into reactor 102. For example, a co-injection particle can be introduced into reactor 102 via nozzle 110 at a rate of about 1,000 lb/hr to about 3,000 lb/hr. In some embodiments, a co-injection particle is a particle configured to trap halogens (e.g., fluorine, chlorine, bromine or iodine present in polymers or contaminants of the plastic melt). During the pyrolysis process, such halogens may appear as unwanted contaminants in desired pyrolysis products, or they may be deposited on or react with pyrolysis catalyst components, thereby reducing desirable catalyst properties such as activity and selectivity to desired pyrolysis products. Further, such halogens may be deposited on or react with mechanical components of the pyrolysis system, leading to damage, reduced efficiency or mechanical failure. Further, such halogens may appear as noxious gases or in liquid effluents from outlets of the pyrolysis system. Co-injection particles configured to trap or sequester halogens may include but are not limited to oxides, carbonates, calcium oxide, calcium carbonate, limestone, metal oxides, mixed metal oxides, clays, sands, earths, zeolites, or any other material or combination of materials able to combine with or sequester one or more halogens, in reversible or irreversible manners, thereby reducing or eliminating halogens from desired pyrolysis products, or thereby reducing or eliminating their deleterious deposition on or reaction with pyrolysis catalyst components, or thereby reducing or eliminating their deleterious deposition on or reaction with mechanical components of the pyrolysis system, or thereby reducing or eliminating their appearance as noxious gases or in liquid effluents from outlets of the pyrolysis system. For example, the co-injection particle can be oxides, carbonates, calcium oxide, calcium carbonate, limestone, metal oxides, mixed metal oxides, clays, sands, earths, zeolites, or any other material or combination(s) of materials capable of combining with and sequestering halogens.

In some embodiments, a co-injection particle comprises a material or combination of materials configured to trap or sequester metals and semi-metals that may be present in the plastic melt. A variety of metals and semi-metals may be present in plastic wastes, particularly post-consumer plastic wastes. These metals and semi-metals may include but are not limited to alkali metals, alkaline earth metals, transition metals, rare earths, iron, silver, copper, zinc, gray tin, lead, phosphorus and aluminum, and may be present as free elements or may be present as inorganic or organic or organometallic molecules, compounds, aggregations, mixtures or other combination(s). During the pyrolysis process, such metals and semi-metals may appear as unwanted contaminants in desired pyrolysis products, or they may be deposited on or react with pyrolysis catalyst components, thereby reducing desirable catalyst properties such as activity and selectivity to desired pyrolysis products. Further, such metals and semi-metals may be deposited on or react with mechanical components of the pyrolysis system, leading to damage, reduced efficiency or mechanical failure. Co-injection particles configured to trap or sequester metals and semi-metals may include but are not limited to oxides, carbonates, calcium oxide, calcium carbonate, limestone, metal oxides, mixed metal oxides, clays, sands, earths, zeolites, or any other material or combination of materials able to combine with or sequester one or more metals or semi-metals, in reversible or irreversible manners, thereby reducing or eliminating them from desired pyrolysis products, or thereby reducing or eliminating their deleterious deposition on or reaction with pyrolysis catalyst components, or thereby reducing or eliminating their deleterious deposition on or reaction with mechanical components of the pyrolysis system.

"4 A zeolite" (also referred to as LTA zeolite) means a zeolite having pore openings of about 4 angstroms; and the term "5 A zeolite" means a zeolite having pore openings of about 5 angstroms.

4 A zeolites ($Na_2O \cdot Al_2O_3 \cdot 2\ SiO_2 \cdot 9/2\ H_2O$) have a continuous three-dimensional network of channels approximately 4 angstrom in diameter, in addition to larger "cages" approximately 7 Å in diameter. 4 A zeolites can have one or more of the following properties: (1) an average particle size of about 3 microns; and/or (2) a silicon:aluminum ratio of about 1.

The pore structure of the 5 A zeolites (¾ CaO·¼ $Na_2O \cdot Al_2O_3 \cdot 2\ SiO_2 \cdot 9/2\ H_2O$) is a three-dimensional network of intersecting channels. Entry to the channels is controlled by the eight oxygen atoms from which they are formed (approx. 3-5 Å diameter). Where the channels intersect, larger pores or cages with diameters of 11.4 Å are formed. 5 A zeolites can have a bulk density of about 0.7 g/cm$^3$ to about 0.75 g/cm$^3$, such as about 0.72 g/cm$^3$.

If calcium oxide is used, the calcium oxide can react with chlorine content of the polymer melt to form calcium chloride and gas product(s) such as carbon dioxide. In some embodiments, a weight ratio of catalyst to co-injection particle in reactor 102 is about 10:1 to about 30:1, such as about 15:1 to about 25:1, such as about 20:1.

The co-injection particle, or product thereof, after sequestration of one or more halogens, or after sequestration of one or more metals or semi-metals, or after sequestration of combinations of one or more halogens, metals or semi-metals, can be removed from the reactor via second conduit 114 and introduced into first separator 104 along with the pyrolysis product.

In some embodiments, the co-injection particle has a smaller average diameter than the average diameter of the pyrolysis catalyst. In such embodiments, in combination with other parameters of the pyrolysis reactor 102, the co-injection particle, or reaction product thereof, (and/or char and attrited catalyst) is able to be removed from reactor 102 to first separator 104 (via a conduit disposed at a top ½ height of the reactor), whereas the larger catalyst particles are removed from reactor 102 via third conduit 116 disposed at a bottom ½ height of the reactor. In some embodiments, a co-injection particle has an average diameter of less than 400 microns, such as less than 200 microns, such as about 50 microns to about 400 microns, such as about 75 microns to about 200 microns, and/or the catalyst has an average diameter of about 500 microns to about 600 microns and/or a narrow particle size distribution. For example, the catalyst can have a D1% value of about 400 microns and a D99% value of about 700 microns.

First separator 104 can be a cyclone separator that is configured to separate the co-injection particle, or product thereof, from the pyrolysis product. The co-injection particle, or product thereof, is removed from first separator 104 via fifth conduit 120 for storage or further processing (e.g., disposal or regeneration). The pyrolysis product is removed from first separator 104 via conduit 118 for storage or further processing (e.g., additional cyclonic separation and/or distillation of products). For example, a second stage of cyclone(s) for secondary removal can be used to increase separation efficiency. Subsequent devices for separation of solids and gases from pyrolysis product can include cyclones, hot gas filters, vortex separators, electrostatic separation, or combination(s) thereof, which can be further added to achieve desired solid removal efficiency.

The catalyst (e.g., spent catalyst) from reactor 102 is introduced into separator 106. In some embodiments, separator 106 is a solid-solid separator. A co-injection particle, or product thereof, from the pyrolysis product can also be removed from separator 106 via sixth conduit 122.

Figure 3:
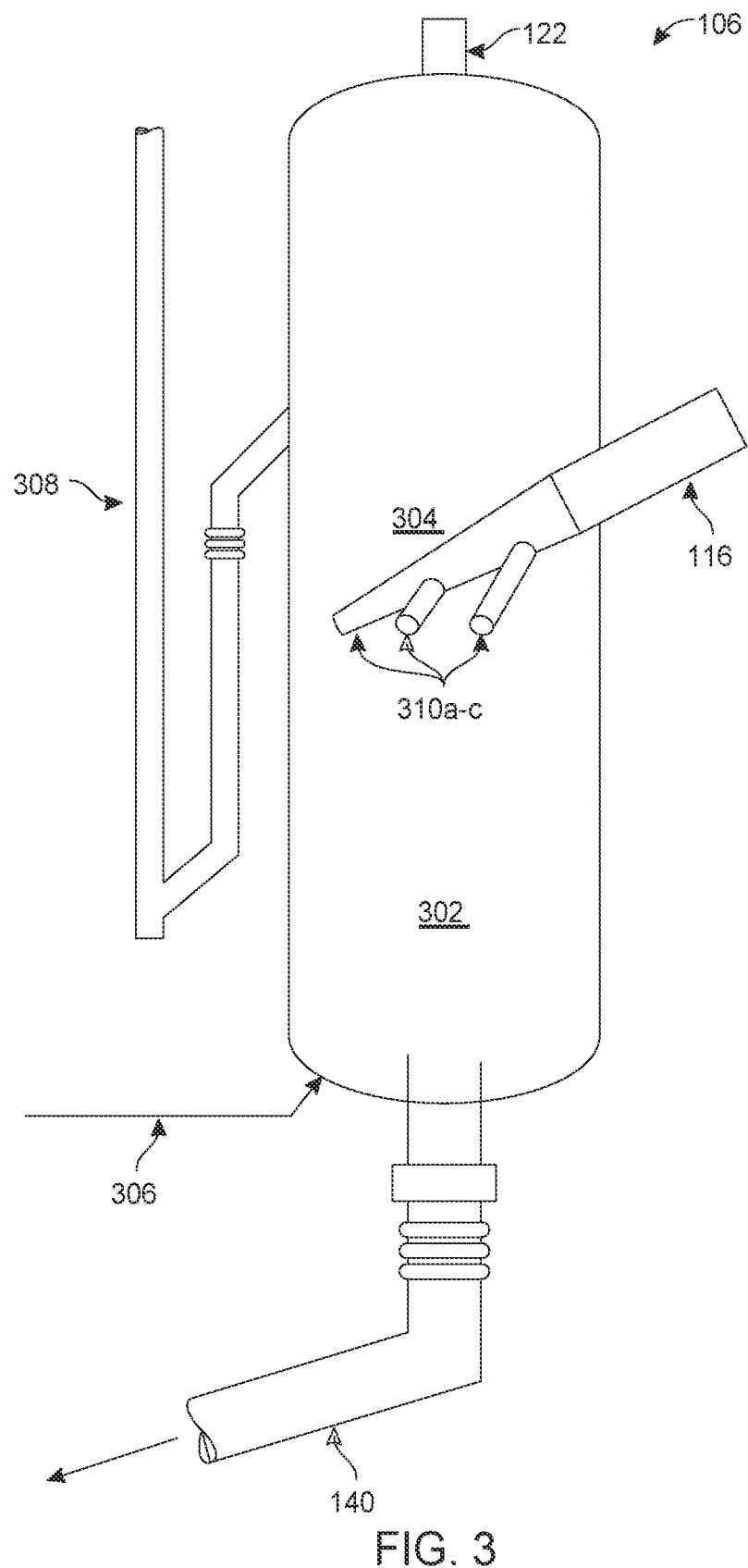
FIG. 3 is a separator, according to an embodiment.

Spent catalyst and ash enter a mid-portion of separator 106. The spent catalyst and ash may further include any residual co-injection particle not separated from the catalyst/ash in the reactor 102. FIG. 3 is a separator 106 of the present disclosure. As shown in FIG. 3, the second end of third conduit 116 is disposed at an angle of about 60° or greater to promote gravimetric flow of the mixture of spent catalyst and ash into separator 106 via third conduit 116. Although the angle shown is about 60°, any suitable angle can be used, such as about 10° to about 90° (vertical inlet), such as about 30° to about 75°, such as about 45° to about 60°. Additionally or alternatively, gas can be introduced into third conduit 116 to promote the flow of the mixture of spent catalyst and ash in third conduit 116 and into separator 106.

In some embodiments, the mixture of spent catalyst and ash entering reactor 106 includes about 90 wt % or greater spent catalyst and about 10 wt % or less ash, such as about 0.5 wt % to about 4 wt % ash and about 96 wt % to about 99.9 wt % spent catalyst. Spent catalyst and ash is introduced into separator 106 at a temperature of about 800° F. to about 1,200° F., such as about 950° F. to about 1,050° F. In some embodiments, spent catalyst and ash are introduced to separator 106 at a rate of about 1 million lbs/hr to about 2 million lbs/hr, such as about 1.3 million lbs/hr to about 1.7 million lbs/hr, such as about 1.4 million lbs/hr to about 1.7 million lbs/hr.

Third conduit 116 has a first end coupled with reactor 102 (of FIG. 1) and a second end coupled with separator 106. As shown in FIG. 3, the second end of third conduit 116 has a plurality of outlets 310a, 310b, and 310c for providing the mixture of spent catalyst and ash into separator 106. Although three outlets 310a-310c are shown in FIG. 3, the second end of third conduit 116 can have any suitable number of outlets, such as a single outlet or about 2 to about 20 outlets, such as about 3 to about 10 outlets, such as about 4 to about 6 outlets. Outlets can be fully or partially open to the separator. A plurality of outlets disposed at the second end of third conduit 116 promotes uniform distribution of the mixture of spent catalyst and ash into separator 106 which, in combination with one or more other features of separator 106, promotes separation of the spent catalyst from the ash. Further, during use, the second end of third conduit 116 is disposed in ash-rich phase 304 (e.g., the second end is disposed at a mid-portion of separator 106 such as disposed at a ¼ to ¾ height of the separator) which promotes separation of spent catalyst from the ash of the mixture being introduced into separator 106 via outlets 310a-c by allowing separation of spent catalyst from the ash followed by settling of the spent catalyst. Once introduced to separator 106, ash separates from the spent catalyst and the ash settles to form the ash-rich phase 304. Likewise, spent catalyst separates from the ash and the spent catalyst settles from the mid-portion of separator 106 toward the bottom portion of separator 106 to form the catalyst-rich phase 302. The "catalyst-rich phase" is rich in spent catalyst and can optionally include an amount of catalyst that is not spent.

Gas is introduced into separator 106 via seventh conduit 306 to fluidize the mixture of spent catalyst and ash. Gas can be provided at a rate of about 0.1 ft/s to about 1.5 ft/s, such as about 0.3 ft/s to about 0.7 ft/s, such as about 0.5 ft/s. The gas can have a temperature of about 150° F. to about 1050° F. The gas can have a lower temperature than the spent catalyst and ash entering separator 106 via third conduit 116 such that the gas can promote cooling of the spent catalyst and ash. In some embodiments, the gas introduced can replace the presence of the trapped reactor gases prior to the introduction into the regenerator combustion system. The rate of gas introduced into separator 106 via seventh conduit 306 can be such that a fine balance is reached between the gas' ability to promote separation of the spent catalyst from the ash and allow the spent catalyst's ability to separate/settle gravimetrically from the ash. Gas in the separator 106 can exit separator 106 via sixth conduit 122 and/or dipleg conduit 308. Ash of ash-rich phase 304 is removed from separator 106 via dipleg outlet 308.

As shown in FIG. 3, the catalyst-rich phase 302 is shown as a bottom phase below the ash-rich phase 304 because, in the embodiments of FIG. 3, the spent catalyst has a higher density and/or a larger particle size than the ash of the ash-rich phase 304. In alternative embodiments, catalyst-rich phase 302 can have a lower density and/or smaller particle size than ash-rich phase 304 and catalyst-rich phase 302 can be above the ash-rich phase 304 in separator 106. In such embodiments, the catalyst-rich phase 302 would be removed from separator 106 via a conduit (not shown) disposed at a mid-portion of separator 106, and the spent catalyst removed by the conduit (not shown) would provide the spent catalyst to the regenerator 108 of FIG. 1. Further in such embodiments, the ash of the ash-rich phase 302 would be disposed toward a bottom portion of separator 106, and the ash would be removed from separator 106 by a conduit (not shown) disposed at a bottom portion of separator 106 for disposal or further processing.

A separation carried out in separator 106 to form the multiple phases can be performed at any suitable pressure and temperature. In some embodiments, a pressure in separator 106 is about 20 psig to about 50 psig, such as about 25 psig to about 40 psig, such as about 30 psig to about 35 psig. In some embodiments, a temperature in separator 106 is about 700° F. to about 1,200° F., such as about 850° F. to about 1,050° F., such as about 950° F. to about 1,000° F.

In some embodiments, the spent catalyst obtained from separator 106 is about 90 wt % or greater, such as about 96 wt % to about 99.9 wt % spent catalyst, relative to the mixture of spent catalyst and ash introduced into separator 106. Likewise, the ash obtained from separator 106 is about 10 wt % or less, such as about 0.5 wt % to about 4 wt % ash, relative to the mixture of spent catalyst and ash introduced into separator 106.

In embodiments where sand is also used in reactor 102 in addition to catalyst, the sand can be separated in separator 106 (e.g., as part of the catalyst-rich phase or as a third phase in addition to the catalyst-rich phase and ash-rich phase). For example, the sand can be disposed in a sand-rich phase that is disposed above or below the catalyst-rich phase 302, and the sand-rich phase can be disposed below the ash-rich phase 304. In such embodiments, the sand-rich phase will be removed from separator 106 via a conduit (not shown) that is disposed below the ash-rich phase 304 and the sand of the sand-rich phase would be removed from separator 106 via the conduit (not shown) that is disposed below the conduit that removed the ash from separator 106.

Additionally or alternatively, in embodiments where trace metals (such as chromium) are separated from the spent catalyst in separator 106. Because trace metals can be denser than a spent catalyst, the trace metals can be separated from spent catalyst and settle as in separator 106 as a metal-rich phase that is disposed below the catalyst-rich phase 302. In such embodiments, the metal-rich phase will be removed from separator 106 via a conduit (not shown) that is disposed below the catalyst-rich phase 302 and the spent-catalyst of the catalyst-rich phase 302 would be removed from separator 106 via a conduit (not shown) that is disposed above the conduit that removed the trace metal from separator 106.

In some embodiments, the conduit used to remove the ash-rich phase from separator can be disposed towards another separator or divided walls acting in series or in stages. Each series or stage geometry can be configured to be separate vessels or discrete chambers integrated into one vessel. Gas can be provided at a rate of about 0.05 ft/s to about 1.5 ft/s, such as about 0.1 ft/s to about 0.3 ft/s, such as about 0.1 ft/s where separation of a third or fourth phase within the ash-rich phase can be achieved to increase separation efficiency from the catalyst-rich phase.

From separator 106, the catalyst (e.g., spent catalyst) is introduced into regenerator 108 via conduit 140 that is configured to form a regenerated catalyst. An oxygen-carrying gas, such as air, may be introduced into the regenerator 108 to regenerate the spent catalyst and combust material (e.g., carbonaceous material disposed on the catalyst such as ash). In some embodiments, air is introduced into the regenerator 108 at a rate of about 107,000 lb/hr to about 165,000 lb/hr, such as about 133,000 lb/hr to about 151,000 lb/hr, such as about 145,000 lb/hr.

The regenerated catalyst formed in regenerator 108 is then introduced into riser 102a.

In some embodiments, the plastic melt is not introduced to the riser 102a. A gas, such as pygas, product gases, reactant gases, recycle gases, or combination(s) thereof, is introduced to the riser 102a via inlet 132. For example, gas is introduced to the riser 102a at a rate of about 18,000 lb/hr to about 23,000 lb/hr, such as about 21,000 lb/hr to about 22,000 lb/hr.

In some embodiments, gas is introduced into reactor 102 via inlet 130. For example, gas can be introduced into reactor 102 via the nozzle at a rate of about 3,000 lb/hr to about 12,000 lb/hr, such as about 7,750 lb/hr to about 10,250 lb/hr. A nozzle can have an outlet having a diameter of about 6 mm to about 20 mm, such as about 13 mm.

The gas introduced to the riser 102a and/or reactor 102 can be refined, product recycled fluid (e.g., gas or liquid). The gas provides a fluidization medium in reactor 102 and also provides improved conversion/yield of reactor feed into pyrolysis product. For example, in embodiments where the gas is a recycled fluid, the recycled fluid can contain olefin material that provides conversion towards a pyrolysis product such as aromatics, increasing target product yield.

Figure 2A:
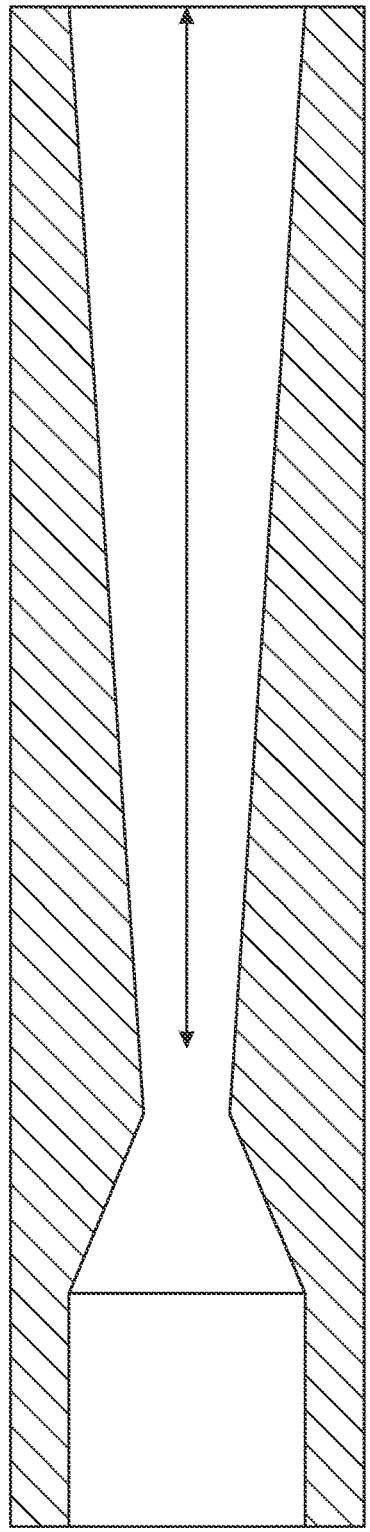
FIG. 2A is a nozzle, according to an embodiment.
Figure 2B:
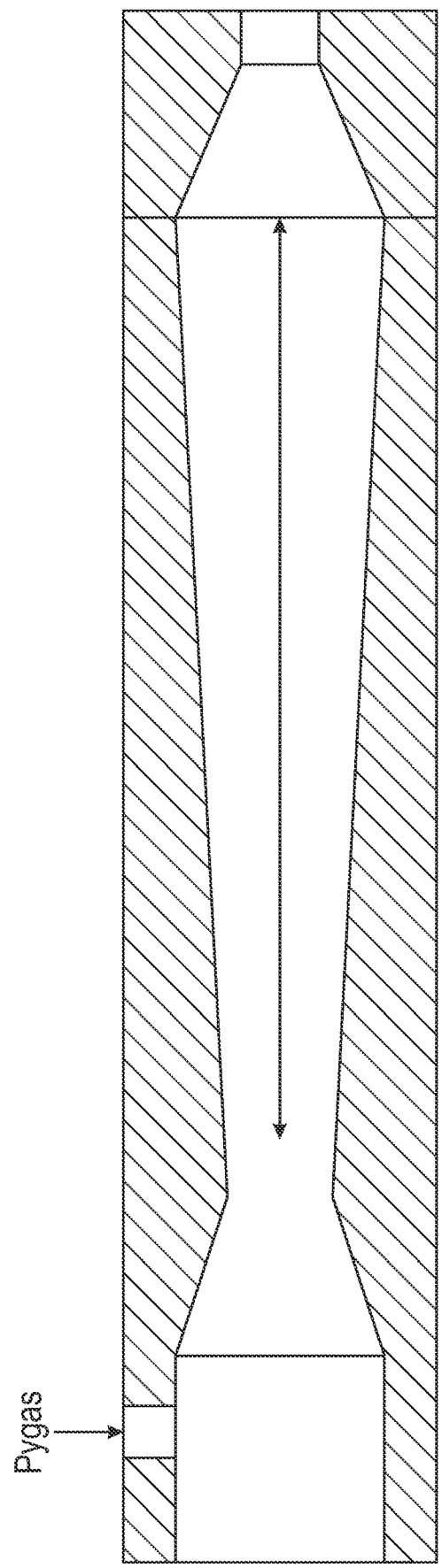
FIG. 2B is a nozzle, according to an embodiment.

In some embodiments, gas (and/or co-injection material and/or recycle oil) is introduced into the reactor indirectly via an inlet of nozzle 110 and nozzle 110 has an outlet diameter that is smaller than a nozzle interior diameter (as shown in FIG. 2B). For example, a nozzle can have a largest interior diameter of about 10 mm to about 20 mm, such as about 15 mm, and the nozzle can have an outlet having a diameter of about 4 mm to about 12 mm, such as about 8 mm. Gas (in combination with recycle oil) injected into the inlet of the nozzle helps initial shear of the plastic melt into fine droplets. The narrow outlet shears the material again into fine droplets, e.g., 70-80 microns, and disperses the droplets. The fine droplets allow heating of the material quickly for pyrolysis (with less undesired byproduct formation due to reduced residence time needed in the reactor).

During use, catalyst particles in reactor 102 can be in an emulsion phase. Because gas is introduced through riser 102a, into reactor 102, and chemical reaction effluent, bubbles can form within reactor 102. Reactor 102 can be configured to break bubbles that form in the reactor 102. By breaking bubbles in reactor 102, mass transfer of plastic melt to catalyst is promoted. For example, molecules of pyrolyzed plastic getting into pores of catalyst is promoted, which promotes better conversion of plastic to pyrolysis product(s). In addition, formation of large bubbles promotes mechanical vibrations within the reactor, so breaking of the bubbles can reduce or eliminate the occurrence of mechanical vibrations promoted by large bubbles.

In some embodiments, reactor 102 has a plurality of plates, mesh, or structure grid sheds (not shown) disposed within the reactor. For example, the plurality of plates, mesh, or structured grids can have an arrangement in a first row and a second row of plates, mesh, or structured grids, where the first row is horizontally offset from the second row. In some embodiments, one or more of the mesh or grid sheds have an angular apex cover in a vertical direction and have one or more openings along its cover.

Catalysts

The catalyst(s) used for pyrolysis of the plastic melt can be any suitable pyrolysis catalyst. In some embodiments, a catalyst is a composite body with multiple components. These components may include one or more materials that are catalytically active in the conversion of plastics in the reactor feed to desired pyrolysis products. These components may, for example, include but are not limited to zeolites, clays, acid impregnated clays, aluminas, silicas, silica-aluminas, spent FCC catalysts, equilibrium FCC catalysts, metal oxides, mixed metal oxides, or combination(s) thereof. The catalyst components may also include one or more materials to bind the catalyst components together to improve their physical strength. Such binder materials may for example include, but are not limited to various aluminas, silicas, magnesias, clays and other earths and minerals. The catalyst components may also include one or more materials to modify other aspects of the composite catalyst bodies, for example density, porosity and pore size distribution. Such modifying materials may include, but are not limited to various aluminum oxides, aluminum hydroxides, aluminum oxyhydroxides, clays, earths, fillers, or combination(s) thereof. Further, such modifying materials may function as hardeners, densifiers, burn out materials to enhance porosity, stabilizers, diluents, activity promoters, activity stabilizers, or combination(s) thereof. Further such modifying materials may include one or more components to sequester feed contaminants such as metals, semi-metals or halogens. Further, such modifying materials may include one or more components to reduce emissions of sulfur oxides, nitrogen oxides, or acid gases from the pyrolysis system. Further, such modifying materials may include one or more components to control and regulate the combustion of carbon and emissions of carbon oxides from the pyrolysis system regenerator. In some embodiments, an additive material is a matrix formed from an active material, such as an active alumina material (amorphous or crystalline), a binder material (such as alumina or silica), an inert filler (such as kaolin), or combination(s) thereof. For example, the catalyst can include a zeolite material disposed in the matrix.

In some embodiments, the various catalyst components are in bodies of one homogeneous composition. In other embodiments, the various components are distributed between two or more bodies that can be physically mixed to achieve the overall desired amounts of the various individual components.

In some embodiments, the catalyst is a Group VIII metal or compound thereof, a Group VIB metal or a metal compound thereof, a Group VIIB metal or a metal compound thereof, or a Group JIB metal or a metal compound thereof, or combination(s) thereof. For example, a Group VIB metal or compound thereof can include molybdenum and/or tungsten. A Group VIII metal or a compound thereof may include nickel and/or cobalt. A Group VIIB metal or a compound thereof may include manganese and/or rhenium. A Group JIB metal or a compound thereof may include zinc and/or cadmium. In some embodiments, a catalyst is a sulfided catalyst. In some embodiments, a catalyst is a cobalt-molybdenum catalyst, a nickel-molybdenum catalyst, a tungsten-molybdenum catalyst, sulfide(s) thereof, or combination(s) thereof. In some embodiments, the catalyst is a platinum-molybdenum catalyst, a tin-platinum catalyst, a platinum gallium catalyst, a platinum-chromium catalyst, a platinum-rhenium, or combination(s) thereof. In some embodiments, a catalyst includes cobalt and molybdenum, nickel and molybdenum, iron and molybdenum, palladium and molybdenum, platinum and molybdenum, or nickel and platinum. A Group IIIB metal or a compound thereof may include lanthanum and/or cerium.

In some embodiments, catalytically active components may include one or more zeolites, which may include but are not limited to X-types, Y-types, mordenites, may be an X-type zeolite, a Y-type zeolite, USY-type zeolite, mordenite, faujasite, nano-crystalline zeolite, an MCM mesoporous material, SBA-15, a silico-alumino phosphate, a gallophosphate, a titanophosphate. In some embodiments, the catalyst may include one or more zeolites (or metal loaded zeolites). In some embodiments, a zeolite is ZSM-5, ZSM-11, aluminosilicate zeolite, ferrierite, heulandite, zeolite A, erionite, chabazite, or combination(s) thereof.

In some embodiments, a catalytically active component is a zeolite, such as a medium-pore zeolite, such as a ZSM-5 zeolite. ZSM-5 zeolite is a molecular sieve that is a porous material having intersecting two-dimensional pore structure with 10-membered oxygen-containing rings. Zeolite materials with such 10-membered oxygen ring pore structure are often classified as medium-pore zeolites. Such medium-pore zeolites typically have pore diameters of 5.0 Angstroms (Å) to 7.0 Å. ZSM-5 zeolite is a medium pore-size zeolite having a pore diameter of about 5.1 Å to about 5.6 Å.

Other properties of ZSM-5 zeolite can include one or more of the following: (1) a $SiO_2/Al_2O_3$ molar ratio of about 20 to about 600, such as about 30; (2) a Brunauer-Emmett-Teller (BET) surface area ($m^2/g$) of about 320 or greater, such as about 340 or greater, such as about 320 to about 380, such as about 340; and/or (3) in the hydrogen or ammonium ion exchange form.

Catalysts of the present disclosure can have a particle size small enough (1) to allow homogeneous reactor and regenerator fluidization without extreme velocities required, (2) to provide good contacting of catalyst to feed (e.g., plastic melt, recycled pygas, etc.) and reduce/minimize external diffusion barriers, (3) to allow for smooth regeneration without hot spots that might arise if particles are too large, and/or (4) to allow for smooth pneumatic transport without a need for high gas velocities. Catalysts of the present disclosure can have a large enough particle size and density (1) to allow high ratio of catalyst to feed during pyrolysis, (2) to allow higher space velocities (throughput) while minimizing entrainment, (3) to allow for good catalyst separation and discharge from reactor bottom and regenerator bottom, and/or (4) allow efficient separation from lighter, smaller ash or separable phase (non-catalyst solids such as char, co-injected materials) if a separator is used. In some embodiments, the catalyst has an average diameter of about 450 microns to about 650 microns, such as about 500 microns to about 600 microns, such as about 540 microns to about 560 microns.

In some embodiments, the catalyst can have a narrow diameter distribution. For example, the catalyst may have a diameter distribution of about +/−200 microns of the average diameter of the catalyst, such as about +/−150 microns, such as about +/−75 microns. In some embodiments, the catalyst has a D1% value of about 380 microns to about 420 microns, such as about 400 microns. D1% is the diameter of the catalyst such that 99 wt % of the catalyst has a diameter greater than the D1% value. In some embodiments, the catalyst has D99% value of about 680 microns to about 720 microns, such as about 700 microns. D99% is the diameter of the catalyst such that 99 wt % of the catalyst has a diameter less than the D99% value. A narrow size (e.g., diameter) distribution of a catalyst can (1) reduce or minimize dense phase segregation in the reactor and the regenerator, (2) reduce or minimize preferential transport and dilute phase transport at high feed or regenerator air rates, and/or (3) reduce or minimize plugging at vessel discharge ports, slide valves, Y-joints, etc.

In some embodiments, the catalyst has an average particle density of about 300 g/l to about 1,200 g/l, such as about 500 g/l to about 1,000 g/l, such as about 600 g/l to about 800 g/l.

In some embodiments, the catalyst has a sphericity of about 0.9 or greater, such as about 0.95 or greater, such as about 0.99 or greater.

In some embodiments, the catalyst has an active catalyst (e.g., zeolite) loading amount of about 50 wt % or greater, such as about 60 wt % or greater, such as about 75 wt % or greater, such as about 85 wt % or greater, where a remainder balance of the catalyst comprises additive material. For example, additive material can include any suitable binder material.

A catalyst of the present disclosure can have an attrition resistance referred to as an attrition resistance index of less than 10 when measured in a jet cup apparatus at an air jet velocity of 200 ft/sec.

A catalyst of the present disclosure can have a crush strength greater than 1 Newton as measured in a single bead anvil test apparatus, such as greater than 5 Newtons.

In some embodiments, a catalyst is in the form of granules, pellets, extrudates, cut extrudates, ligated extrudates, beads, tablets, spheres, or combination(s) thereof.

Catalysts of the present disclosure may be obtained by any suitable process (such as spray drying) and/or may be obtained from a commercial source. For example, a catalyst can be formed by spray drying, prilling, oil dropping, water dropping, granulating, fluid bed agglomerization, spray coating tableting, extruding, or any combination(s) thereof. Catalysts can be cut, crushed, milled, or screened to provide any suitable size (e.g., diameter) distribution. Catalysts can be further prepared by polishing, densifying, or spheronizing in rotating pans, rotating drums, and the like.

More than one type of catalyst may be introduced to the reactor 102. For example, a first catalyst is introduced to the reactor 102 by a conduit and a second catalyst is introduced to the reactor 102 by a different conduit. The first catalyst and the second catalyst can be introduced into the reactor 102 at the same or different flow rates to control relative amounts of catalyst in reactor 102 at any given time. A remainder balance of the first catalyst and/or the second catalyst can include additive material, such as binder material.

Additionally or alternatively, a first catalyst and a second catalyst are introduced to reactor 102 via a single conduit (as a mixture of catalysts). For example, the mixture of catalysts can be a single-body catalyst including the two catalysts. A remainder balance of the single-body catalyst can include additive material, such as binder material.

In some embodiments, sand of a density of about 1450 g/l to about 1680 g/l can be mixed with a catalyst. Examples of sand include quartz sand, silica sand, sand containing metal or metal oxide, or combination(s) thereof. The use of sand may inhibit fouling of the catalyst by contaminants produced during the pyrolysis. Sand can also provide control of thermal and catalytic activities of pyrolysis occurring in the reactor. Sand may be used at an amount of up to about 99 wt % based on the total amount of sand+catalyst.

ADDITIONAL ASPECTS

The present disclosure provides, among others, the following aspects, each of which may be considered as optionally including any alternate aspects.

Clause 1. A process, comprising:
  introducing a plastic melt comprising a plastic component into a reactor via a nozzle coupled with the reactor;
  introducing a catalyst into the reactor via a first conduit coupling the reactor with a riser or a regenerator;
  pyrolyzing the plastic component to form a pyrolysis product;
  removing the pyrolysis product from the reactor via a second conduit disposed at a top ½ height of the reactor;
  removing the catalyst from the reactor via a third conduit disposed at a bottom ½ height of the reactor, wherein the catalyst removed from the reactor comprises ash; and
  introducing the catalyst from the third conduit to a separator to form a catalyst-rich phase and an ash-rich phase in the separator.

Clause 2. The process of Clause 1, wherein the third conduit is disposed at an angle of about 30° to about 90° relative to a substantially vertical side of the separator.

Clause 3. The process of Clauses 1 or 2, further comprising introducing a gas to the third conduit.

Clause 4. The process of any of Clauses 1 to 3, wherein the catalyst introduced to the separator has a temperature of about 950° F. to about 1,050° F. when introduced to the separator and is introduced to the separator at a rate of about 1.3 million lbs/hr to about 1.7 million lbs/hr.

Clause 5. The process of any of Clauses 1 to 4, wherein the third conduit has an end disposed within the separator and the end comprises a plurality of outlets.

Clause 6. The process of any of Clauses 1 to 5, wherein the end of the third conduit is disposed at a ¼ to ¾ height of the separator.

Clause 7. The process of any of Clauses 1 to 6, further comprising introducing a gas into the separator via a fourth conduit at a rate of about 0.3 ft/s to about 0.7 ft/s, wherein the gas has a temperature of about 150° F. to about 1050° F.

Clause 8. The process of any of Clauses 1 to 7, wherein forming the catalyst-rich phase and the ash-rich phase in the separator is performed at a pressure of about 25 psig to about 40 psig and a temperature of about 850° F. to about 1,050° F.

Clause 9. The process of any of Clauses 1 to 8, further comprising introducing the catalyst-rich phase to the regenerator.

Clause 10. The process of any of Clauses 1 to 9, wherein the catalyst introduced into the reactor comprises a zeolite and sand and the catalyst introduced from the third conduit to the separator comprises the zeolite, the sand, and the ash.

Clause 11. The process of any of Clauses 1 to 10, wherein introducing the catalyst from the third conduit to the separator further forms a sand-rich phase in the separator, the process further comprising removing the sand-rich phase from the separator via a fourth conduit.

Clause 12. The process of any of Clauses 1 to 11, further comprising sorting a bale comprising the plastic component into a plurality of portions, wherein at least one of the portions comprises the plastic component.

Clause 13. The process of any of Clauses 1 to 12, wherein the reactor is a bubbling bed reactor and the plastic melt has a temperature of about 900° F. to about 1,100° F. during introducing the plastic melt into the reactor.

Clause 14. The process of any of Clauses 1 to 14, wherein the plastic component is selected from the group consisting of polyethylene, polypropylene, polystyrene, polyethylene terephthalate, polyvinylchloride, and combination(s) thereof.

Clause 15. The process of any of Clauses 1 to 14, wherein the pyrolysis product comprises an organic compound selected from the group consisting of an ethylene, a propylene, a butene, a benzene, a toluene, a xylene, and combination(s) thereof.

Clause 16. The process of any of Clauses 1 to 15, further comprising introducing a co-injection particle into the reactor.

Clause 17. The process of any of Clauses 1 to 16, wherein the co-injection particle is introduced into the reactor via the nozzle at a rate of about 1,000 lb/hr to about 3,000 lb/hr.

Clause 18. The process of any of Clauses 1 to 17, further comprising removing the co-injection particle, or product thereof, from the reactor via the second conduit.

Clause 19. The process of any of Clauses 1 to 18, wherein the co-injection particle is calcium oxide and the process includes removing calcium chloride from the reactor via the second conduit.

Clause 20. The process of any of Clauses 1 to 19, wherein the co-injection particle is a zeolite selected from the group consisting of 4 A zeolite, 5 A zeolite, and combination(s) thereof.

Clause 21. The process of any of Clauses 1 to 20, wherein the co-injection particle has an average diameter of less than 400 microns.

Clause 22. The process of any of Clauses 1 to 21, wherein the co-injection particle has an average diameter of less than 200 microns.

Clause 23. The process of any of Clauses 1 to 22, further comprising:
introducing the co-injection particle, or product thereof, to a cyclone separator via the second conduit;
separating the co-injection particle, or product thereof, from the pyrolysis product using the cyclone separator;
removing the pyrolysis product from the cyclone via a fourth conduit; and
removing the co-injection particle, or product thereof, from the cyclone via fifth conduit.

Clause 24. The process of any of Clauses 1 to 23, further comprising introducing pygas into the reactor.

Clause 25. The process of any of Clauses 1 to 24, wherein introducing the pygas into the reactor is performed via the nozzle at a rate of about 6,000 lb/hr to about 12,000 lb/hr.

Clause 26. The process of any of Clauses 1 to 25, wherein introducing the plastic melt into the reactor is performed at a rate of about 60,000 lb/hr to about 100,000 lb/hr.

Clause 27. The process of any of Clauses 1 to 26, wherein removing the catalyst from the reactor comprises removing the catalyst from the reactor via the third conduit disposed at a bottom surface of the reactor.

Clause 28. The process of any of Clauses 1 to 27, further comprising introducing the catalyst from the reactor to a separator and a regenerator to form a regenerated catalyst.

Clause 29. The process of any of Clauses 1 to 28, further comprising introducing the regenerated catalyst to the riser or a vessel.

Clause 30. The process of any of Clauses 1 to 29, wherein the plastic melt is not introduced to the riser.

Clause 31. The process of any of Clauses 1 to 30, further comprising introducing gas to the riser.

Clause 32. The process of any of Clauses 1 to 31, wherein pygas is introduced to the riser at a rate of about 9,000 lb/hr to about 11,500 lb/hr.

Clause 33. The process of any of Clauses 1 to 32, wherein the nozzle coupled with the reactor is further coupled with a plastic melt source, wherein the plastic melt source is not the riser.

Clause 34. The process of any of Clauses 1 to 33, wherein the plastic melt further comprises a viscosity reducing agent.

Clause 35. The process of any of Clauses 1 to 34, wherein the viscosity reducing agent comprises an aromatic liquid selected from the group consisting of a benzene, a toluene, a xylene, and combination(s) thereof.

Clause 36. The process of any of Clauses 1 to 35, wherein pyrolyzing the plastic component is performed at a reactor temperature of about 900° F. to about 1,100° F. and a reactor pressure of about 20 psig to about 40 psig.

Clause 37. The process of any of Clauses 1 to 36, wherein pygas is introduced into the reactor via the nozzle and the nozzle has an outlet diameter that is smaller than a nozzle interior diameter.

Clause 38. The process of any of Clauses 1 to 37, wherein introducing the catalyst into the reactor via the first conduit is performed at a catalyst flow rate of about 5.5 tons per minute to about 13.8 tons per minute.

Clause 39. The process of any of Clauses 1 to 38, wherein introducing the catalyst into the reactor via the first conduit is performed at a catalyst flow rate of about 7.5 tons per minute to about 12.4 tons per minute.

Clause 40. The process of any of Clauses 1 to 39, wherein the catalyst is disposed in the riser before being introduced into the reactor and the catalyst has a minimum gas fluidization velocity of about 0.4 ft/sec to about 0.6 ft/sec.

Clause 41. The process of any of Clauses 1 to 40, wherein the catalyst is a zeolite.

Clause 42. The process of any of Clauses 1 to 41, wherein the zeolite is a ZSM-5 zeolite.

Clause 43. The process of any of Clauses 1 to 42, wherein the catalyst has an average diameter of about 500 microns to about 600 microns.

Clause 44. The process of any of Clauses 1 to 43, wherein the catalyst has a D1% value of about 400 microns and a D99% value of about 700 microns.

Clause 45. The process of any of Clauses 1 to 44, wherein the catalyst has a density of about 600 g/l to about 800 g/l.

Clause 46. The process of any of Clauses 1 to 45, wherein the catalyst has a sphericity of about 0.95 or greater.

Clause 47. The process of any of Clauses 1 to 46, wherein the catalyst has a zeolite loading amount of about 50 wt % or greater, wherein a remainder balance of the catalyst comprises additive material.

Clause 48. The process of any of Clauses 1 to 47, wherein the catalyst has a zeolite loading amount of about 75 wt % or greater.

Clause 49. The process of any of Clauses 1 to 48, wherein the additive material comprises a binder material.

Clause 50. The process of any of Clauses 1 to 49, wherein the reactor comprises a plurality of plates, mesh, or square grid comprising a first row of plates, mesh, or square grid and a second row of plates, mesh, or square grid, wherein the first row is horizontally offset from the second row.

Clause 51. The process of any of Clauses 1 to 50, wherein each plate, mesh, or square of the plurality of plates, mesh, or square grid has a tent shape an angular apex cover in a vertical direction and has one or more openings along the cover.

Clause 52. The process of any of Clauses 1 to 51, wherein the plastic melt has a solids content of about 10 wt % or less.

Clause 53. An apparatus, comprising:
a nozzle coupled with a reactor, the nozzle comprising an inlet disposed substantially perpendicular to a horizontal conduit disposed in the nozzle;
a riser coupled with the reactor;
a first outlet conduit disposed at a top ½ height of the reactor, the first outlet conduit coupled with a cyclone separator; and
a second outlet conduit disposed at a bottom ½ height of the reactor, the second outlet conduit coupled with a second separator;

a regenerator coupled with the second separator and the riser.

Clause 54. The apparatus of Clause 53, wherein the reactor comprises a plurality of plates, mesh, or square grid comprising a first row and a second row of plates, mesh, or square grid, wherein the first row is horizontally offset from the second row.

Clause 55. The apparatus of Clauses 53 or 54, wherein the second outlet conduit is disposed at a bottom surface of the reactor.

Clause 56. A process, comprising:
removing a catalyst from a reactor, wherein the catalyst comprises ash;
introducing the catalyst via a conduit to a separator to form a catalyst-rich phase and an ash-rich phase in the separator; and
introducing the catalyst-rich phase to a regenerator to form a regenerated catalyst,
wherein the conduit has an end disposed within the separator at a ¼ to ¾ height of the separator and the end comprises a plurality of outlets.

Clause 57. The process of any of Clauses 1 to 52 or 56, wherein the conduit is disposed at an angle of about 30° to about 90° relative to a substantially vertical side of the separator.

Clause 58. The process of any of Clauses 1 to 52, 56, or 57, further comprising introducing a gas to the conduit.

Clause 59. The process of any of Clauses 1 to 52 or 56 to 58, wherein the catalyst introduced to the separator has a temperature of about 950° F. to about 1,050° F. when introduced to the separator and is introduced to the separator at a rate of about 1.3 million lbs/hr to about 1.7 million lbs/hr.

Clause 60. The process of any of Clauses 1 to 52 or 56 to 59, further comprising introducing a gas into the separator via a second conduit at a rate of about 0.3 ft/s to about 0.7 ft/s, wherein the gas has a temperature of about 150° F. to about 1050° F.

Clause 61. The process of any of Clauses 1 to 52 or 56 to 60, wherein forming the catalyst-rich phase and the ash-rich phase in the separator is performed at a pressure of about 25 psig to about 40 psig and a temperature of about 850° F. to about 1,050° F.

Clause 62. The process of any of Clauses 1 to 52 or 56 to 61, wherein the catalyst introduced into the reactor comprises a zeolite and sand and the catalyst introduced from the conduit to the separator comprises the zeolite, the sand, and the ash.

Clause 63. The process of any of Clauses 1 to 52 or 56 to 62, wherein introducing the catalyst from the conduit to the separator further forms a sand-rich phase in the separator, the process further comprising removing the sand-rich phase from the separator via a second conduit.

Clause 64. The process of any of Clauses 1 to 52 or 56 to 63, further comprising introducing the ash-rich phase to a second separator to form a second catalyst-rich phase and a second ash-rich phase.

Clause 65. The process of Clause 64, wherein the second separator is a stage volume within the first separator.

Overall, apparatus and processes of the present disclosure provide high throughput of pyrolysis, such as plastic pyrolysis, to form pyrolysis products. Processes can be performed as a single-stage process, providing higher yields than conventional processes for processing waste plastic. Apparatus and processes of the present disclosure provide elutriation of char, attrited catalyst, and co-injection material such that spent catalyst can be easily regenerated, providing improved throughput of plastic pyrolysis in addition to higher purity of recycled catalyst to the reactor. In addition, use of catalyst having a narrow size distribution and larger average diameter than the co-injection material provides the elutriation of co-injection material. In addition, use of catalyst having a large average diameter, in addition to a reactor configured to provide bubble control, provides reduced plugging and wear of vessel conduits, valves, and other apparatus components, providing maintained integrity and a longer life cycle of apparatus of the present disclosure. In addition, use of a separator of the present disclosure provides improved throughput of pyrolysis products because of improved separation of spent catalyst from components such as ash. Throughput is improved using the separator because, inter alia, the time intervals between apparatus shutdown can be lengthened because catalyst can remain viable (e.g., the catalyst is regenerated). A separator of the present disclosure can also provide improved regeneration of spent catalyst (because ash is removed in the separator), which further improves throughput and yield of pyrolysis products.

The term "pyrolysis" includes an on-average endothermic reaction for converting molecules into (i) atoms and/or (ii) molecules of lesser molecular weight, and/or optionally (iii) molecules of greater molecular weight, e.g., processes for forming $C_2$-$C_{12}$ unsaturates such as ethylene, propylene, acetylene, benzene, toluene, xylene, or combination(s) thereof.

The term "catalyst activity" includes the weight of volatile matter converted per catalyst weight over a given amount of time.

The term "spent catalyst" includes any catalyst that has less activity at the same reaction conditions (e.g., temperature, pressure, inlet flows) than the catalyst had when it was originally exposed to the process. This can be due to a number of reasons, several non-limiting examples of causes of catalyst deactivation are coking or char sorption or accumulation, metals sorption or accumulation, attrition, morphological changes including changes in pore sizes, cation or anion substitution, and/or chemical or compositional changes. Spent catalyst can include an amount of catalyst that is not spent (e.g., has not been deactivated) in addition to catalyst that is spent.

The term "regenerated catalyst" includes a catalyst that had become spent, as defined above, and was then subjected to a process that increased its activity, as defined above, to a level greater than it had as a spent catalyst. This may involve, for example, reversing transformations or removing contaminants outlined above as possible causes of reduced activity. The regenerated catalyst may have an activity greater than or equal to the fresh catalyst (typically referred to herein as "catalyst" unless otherwise noted), but typically, regenerated catalyst has an activity that is between the spent and fresh catalyst.

The term "pygas" includes a hydrocarbon fluid (gas or liquid) that is derived from waste plastic material. Pygas can exist as either a raw effluent stream from a reactor or a refined material recycled via a recycle stream for use of fluidization or further conversion in the reactor system.

The term "ash" includes ash that is removed from the reactor and separated from other material. The ash is a solid phase that is considered not part of the size fraction of the catalyst that is circulating through the apparatus. Ash can be attrited catalyst fines, char from plastics, and/or co-injected materials which could be metal-oxides or catalyst by material.

Although embodiments of the present disclosure have been described for pyrolysis of plastic feeds, embodiments of the present disclosure where applicable might be used in any other suitable apparatus or process. For example, a separator of the present disclosure (e.g., separator 106) may be utilized in any suitable apparatus or process, such as a solid-solid separation incorporated with conventional petrochemical processes, such as fluidized catalytic cracking of crude oil and the like.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All numerical values within the detailed description herein are modified by "about" the indicated value, and take into account experimental error and variations that would be expected by a person having ordinary skill in the art.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of" "selected from the group consisting of" or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

We claim:

1. A process, comprising:
   introducing a plastic melt comprising a plastic component into a reactor via a nozzle coupled with the reactor;
   introducing a catalyst into the reactor via a first conduit coupling the reactor with a riser or a regenerator;
   introducing a co-injection particle into the reactor, the co-injection particle having an average diameter less than an average diameter of the catalyst;
   pyrolyzing the plastic component to form a pyrolysis product;
   removing the pyrolysis product and the co-injection particle from the reactor via a second conduit disposed in a top ½ height of the reactor;
   removing the catalyst from the reactor via a third conduit disposed in a bottom ½ height of the reactor, wherein the catalyst removed from the reactor comprises ash; and
   introducing the catalyst from the third conduit to a separator to form a catalyst-rich phase and an ash-rich phase in the separator.

2. The process of claim 1, wherein the third conduit is disposed at an angle of about 30° to about 90° relative to a side of the separator coupled with the third conduit.

3. The process of claim 2, further comprising introducing a gas to the third conduit.

4. The process of claim 2, wherein the separator has a temperature of about 700° F. to about 1,050° F. when introduced to the separator.

5. The process of claim 1, wherein forming the catalyst-rich phase and the ash-rich phase in the separator is performed at a pressure of about 25 psig to about 40 psig and a temperature of about 700° F. to about 1,050° F.

6. The process of claim 1, wherein the third conduit has an end disposed within the separator and the end has one outlet.

7. The process of claim 1, further comprising introducing a gas into the separator via a fourth conduit at a rate of about 0.3 ft/s to about 1.5 ft/s, wherein the gas has a temperature of about 150° F. to about 1,050° F.

8. The process of claim 1, wherein introducing the catalyst from the third conduit to the separator comprises operating the separator at a pressure of about 25 psig to about 40 psig and a temperature of about 700° F. to about 1,050° F.

9. The process of claim 1, further comprising introducing the catalyst-rich phase to the regenerator.

10. The process of claim 1, wherein the catalyst introduced into the reactor comprises a zeolite and sand and the catalyst introduced from the third conduit to the separator comprises the zeolite, the sand, and the ash.

11. The process of claim 10, wherein introducing the catalyst from the third conduit to the separator further forms a sand-rich phase in the separator, the process further comprising removing the sand-rich phase from the separator via a fourth conduit.

12. The process of claim 1, further comprising introducing the ash-rich phase to a second separator to form a second catalyst-rich phase and a second ash-rich phase.

13. The process of claim 1, further comprising sorting a bale comprising the plastic component into a plurality of portions, wherein at least one of the portions comprises the plastic component.

14. The process of claim 1, wherein the co-injection particle has an average diameter of about 75 microns to about 200 microns.

15. The process of claim 14, wherein the catalyst has an average diameter of about 500 microns to about 600 microns.

16. The process of claim 14, wherein the catalyst has an average diameter of about 500 microns to about 600 microns.

17. The process of claim 16, wherein the catalyst has a diameter distribution of about +/−200 microns of the average diameter of the catalyst.

18. The process of claim 1, wherein the co-injection particle is a metal oxide.

19. The process of claim 18, wherein the co-injection particle is calcium oxide.

20. The process of claim 1, wherein the co-injection particle is a metal carbonate.

21. The process of claim 20, wherein the co-injection particle is calcium carbonate.

22. The process of claim 1, further comprising introducing the pyrolysis product and the co-injection particle via the second conduit to a cyclone separator and separating the pyrolysis product from the co-injection particle in the cyclone separator.

23. The process of claim 1, wherein the plastic melt has a temperature of about 300° F. to about 700° F. when introduced into the reactor.

24. The process of claim 1, wherein the plastic melt comprises an organic compound.

25. The process of claim 1, further comprising introducing a gas into the separator at a rate of about 0.1 ft/s to about 1.5 ft/s, wherein the gas has a temperature of about 150° F. to about 1,050° F.

26. The process of claim 25, wherein introducing the catalyst from the third conduit to the separator comprises operating the separator at a pressure of about 20 psig to about 50 psig and a temperature of about 700° F. to about 1,050° F.

\* \* \* \* \*